(12) United States Patent
Purchase et al.

(10) Patent No.: US 8,974,069 B2
(45) Date of Patent: Mar. 10, 2015

(54) OPTICAL DIFFUSERS WITH SPATIAL VARIATIONS

(75) Inventors: Ken G. Purchase, Morrisville, NC (US);
William R. LeFew, Durham, NC (US);
Robert L. Wood, Cary, NC (US);
Robert M. Soule, III, Rougemont, NC (US)

(73) Assignee: Bright View Technologies Corporation, Richmond, VA (US)

( * ) Notice: Subject to any disclaimer, the term of this patent is extended or adjusted under 35 U.S.C. 154(b) by 1124 days.

(21) Appl. No.: 12/506,915

(22) Filed: Jul. 21, 2009

(65) Prior Publication Data

US 2010/0039808 A1      Feb. 18, 2010

Related U.S. Application Data

(60) Provisional application No. 61/082,725, filed on Jul. 22, 2008.

(51) Int. Cl.
| | |
|---|---|
| *G09F 13/04* | (2006.01) |
| *G02B 3/00* | (2006.01) |
| *G02B 5/02* | (2006.01) |
| *G02F 1/1335* | (2006.01) |

(52) U.S. Cl.
CPC ............ *G09F 13/0409* (2013.01); *G02B 3/005* (2013.01); *G02B 5/0263* (2013.01); *G02F 1/133604* (2013.01); *G02B 3/0043* (2013.01); *G02F 2001/133607* (2013.01)

USPC .......................... 362/97.2; 362/97.1; 362/97.3

(58) Field of Classification Search
USPC ................................................ 362/97.1–97.3
See application file for complete search history.

(56) References Cited

U.S. PATENT DOCUMENTS

| | | | |
|---|---|---|---|
| 7,092,166 | B1 | 8/2006 | Wood |
| 7,190,387 | B2 | 3/2007 | Rinehart et al. |
| 7,192,692 | B2 | 3/2007 | Wood et al. |
| 2005/0058948 | A1 | 3/2005 | Freese et al. |
| 2006/0275714 | A1 | 12/2006 | Rinehart et al. |
| 2007/0003868 | A1 | 1/2007 | Wood et al. |
| 2008/0089063 | A1* | 4/2008 | Chen .............................. 362/246 |
| 2008/0233519 | A1 | 9/2008 | Wood et al. |

FOREIGN PATENT DOCUMENTS

WO      WO 99/36830 A2      7/1999

* cited by examiner

*Primary Examiner* — Sean Gramling
(74) *Attorney, Agent, or Firm* — Myers Bigel Sibley & Sajovec, P.A.

(57) ABSTRACT

A diffuser is configured to diffuse radiation from multiple light sources. The diffuser includes a substrate having optical structures that exhibit both microvariations and macrovariations along the substrate. For example, an array of microlenses may be provided that include at least one feature that varies as a function of the spacing between the light sources. Lighting systems using these diffusers may also be provided.

27 Claims, 8 Drawing Sheets

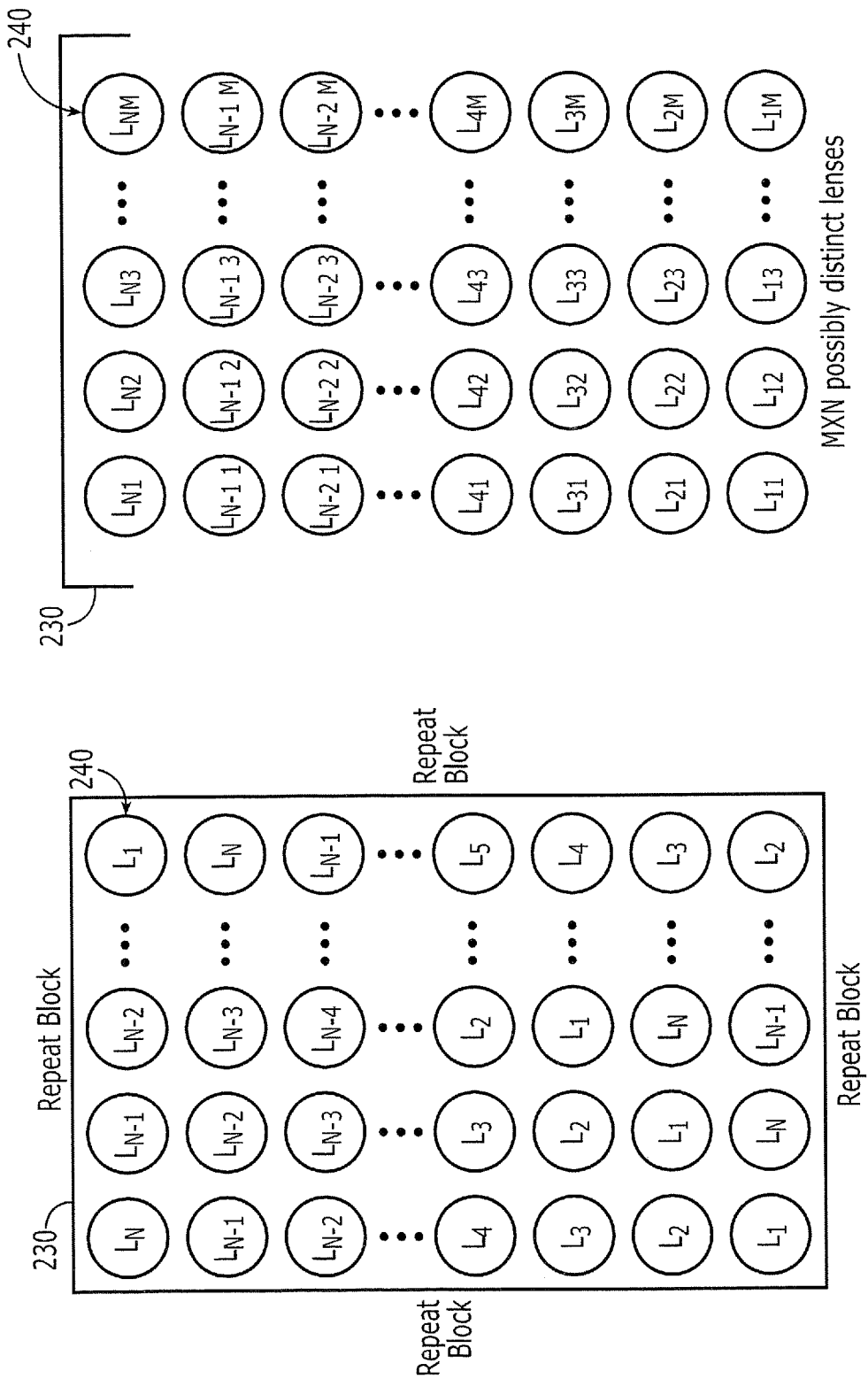

Pseudoperiodic Example

OPTICAL DIFFUSERS WITH SPATIAL VARIATIONS

CROSS-REFERENCE TO RELATED APPLICATION

This application claims the benefit of U.S. provisional Application No. 61/082,725, filed Jul. 22, 2008, entitled Optical Diffusers With Spatial Variation, assigned to the assignee of the present invention, the disclosure of which is hereby incorporated herein by reference in its entirety as if set forth fully herein.

BACKGROUND OF THE INVENTION

This invention relates to lighting systems and, more particularly, to optical elements that are used in lighting systems.

Lighting systems are commonly used for many lighting/illumination applications, such as general purpose illumination, backlights, signals and displays. Lighting systems generally include one or more light sources. A diffuser is generally provided to diffuse the light that is emitted from the light source, so as to homogenize the light and reduce direct visibility of the light source to a viewer. In many applications, multiple light sources, such as multiple Cold Cathode Fluorescent (CCFL) bulbs, multiple Light Emitting Diodes (LEDs) and/or multiple incandescent bulbs are used, and it may be desirable for the diffuser to homogenize the light from the multiple light sources.

SUMMARY OF THE INVENTION

Various embodiments described herein provide a diffuser that is configured to diffuse radiation from a plurality of light sources having predetermined spacing therebetween. These diffusers comprise a substrate having first and second opposing faces. An array of microlenses is provided on the first face. The microlenses in the array include at least one feature that varies as a function of the predetermined spacing between the plurality of light sources. In some embodiments, the at least one feature varies sufficiently as a function of the predetermined spacing between the plurality of light sources, so as to obscure the plurality of light sources when the diffuser is viewed from opposite the plurality of light sources.

Other embodiments provide diffusers that comprise a substrate including optical structures therein and/or thereon that exhibit both microvariations and macrovariations along the substrate. The microvariations may vary on the order of microns, and the macrovariations may vary on the order of millimeters. Thus, in some embodiments, the microlenses in the array may have a dimension that is less than about 100 μm, and the predetermined spacing may be between 0.1" and about 10". In still other embodiments, a ratio of the dimension of the microlenses and the predetermined spacing (i.e., a ratio of the microvariations and the macrovariations) may be between about 1:100 and about 1:1000.

Diffusers according to various embodiments described herein may be closely spaced apart from a plurality of light sources, to provide a lighting system. A homogeneous diffuser plate also may be provided between the plurality of light sources and the substrate.

Many different features that vary as a function of the predetermined spacing between the plurality of light sources may be provided for the array of microlenses, according to various embodiments described herein. For example, in some embodiments, the at least one varying feature provides more refraction from the array of microlenses adjacent the plurality of light sources compared to remote from the plurality of light sources when the substrate is closely spaced apart from the plurality of light sources. In other embodiments, the at least one varying feature provides more reflection, such as by total internal reflection, from the array of microlenses adjacent the plurality of light sources compared to remote from the plurality of light sources when the substrate is closely spaced apart from the plurality of light sources. In other embodiments, the at least one feature varies in one more directions along the substrate as a function of the predetermined spacing between the light sources. The at least one feature may vary a dimension of the microlenses, a type of the microlenses, a shape of the microlenses, an aspect ratio of the microlenses, a conic content of the microlenses, a shape extent of the microlenses, a surface roughness of the microlenses, a change in a dimple, bump or other surface feature of the microlenses and/or a change in sidewall angle of the microlenses, as a function of the predetermined spacing between the plurality of light sources. In still other embodiments, the at least one feature may vary a relative proportion of first and second microlenses as a function of the predetermined spacing between the plurality of light sources. Moreover, in any of these embodiments, at least one feature may also vary randomly or pseudorandomly independent of the predetermined spacing between the plurality of light sources.

In yet other embodiments, the array of microlenses comprises an array of repeating unit cells of microlenses, wherein the microlenses in a respective repeating unit cell are defined by the at least one feature that varies as a function of the predetermined spacing between the plurality of light sources. In some embodiments, the unit cells are identical. In other embodiments, the unit cells may progressively change as a function of relative position on the substrate. In yet other embodiments, the unit cells may change in a sequentially truncated, pseudoperiodic and/or aperiodic manner as a function of position on the substrate.

Diffusers may also include other elements according to various other embodiments. For example, in some embodiments, the substrate itself may include variable optical properties thereacross. In other embodiments, the second face of the substrate may include variable optical properties across. In yet other embodiments, the at least one feature of the microlenses may also vary as a function of the position of the microlenses relative to an edge of the substrate.

BRIEF DESCRIPTION OF THE DRAWINGS

FIGS. 2I-2N are top views of diffusers according to various embodiments of the invention.

DETAILED DESCRIPTION

Some embodiments of the invention can provide optical films with spatial variation for producing gain while controlling spatial intensity variations in display applications.

Figure 1A:
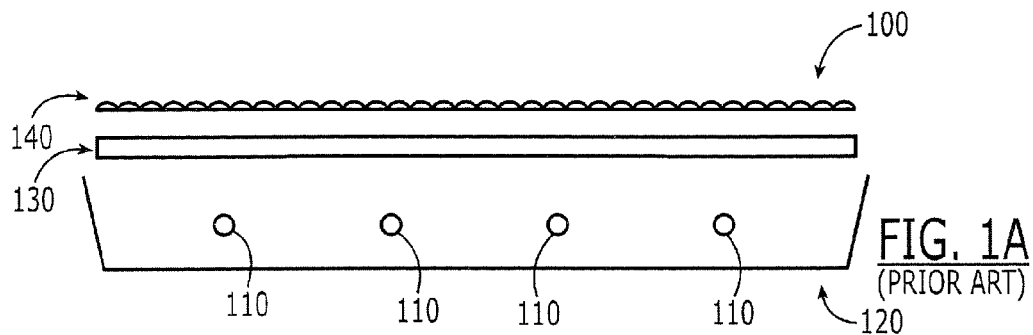
FIGS. 1A and 1B are cross-sectional and perspective views, respectively, of conventional lighting systems.
Figure 1B:
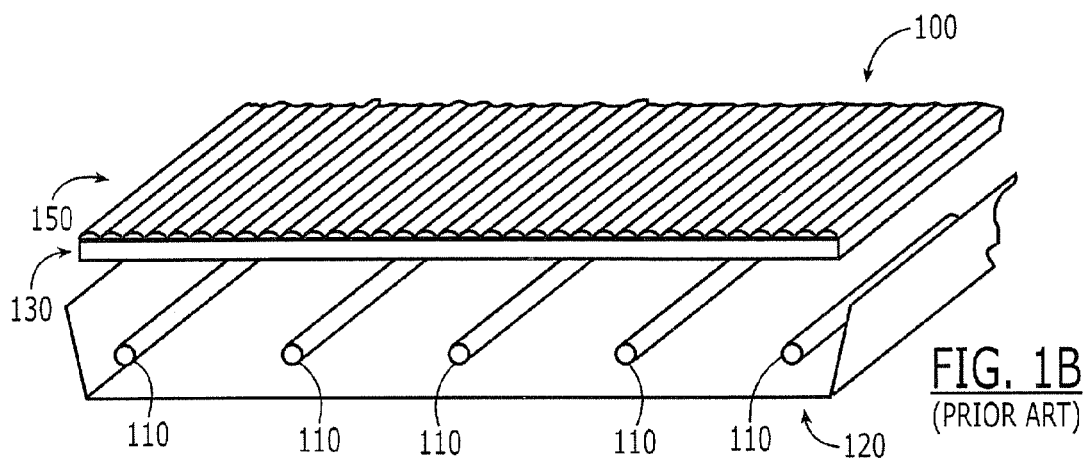

In illumination applications (LCD TV, LCD Monitor, lighting, etc.), a light source is used to provide illumination. For example, in display Back Light Unit (BLU) applications, multiple light sources are used behind a display panel. FIG. 1A is a cross-sectional view of a conventional BLU 100. Light sources 110 commonly use Cold Cathode Fluorescent (CCFL) bulbs or LEDs, either directly-lit or side-lit, directly, or through a light guide or other system. A reflector 120 also may be used. Generally, the light source 110 is not spatially uniform (such as having CCFL bulbs separated by a few centimeters). Diffusers, in terms of rigid plastic plates 130 and/or thin film(s) 140, are often used to homogenize the light, so that the display panel is uniformly illuminated and the light source(s) 110 are not visible to the viewer. Currently, diffusers generally do not vary spatially on the order of the bulb spacing. They usually have features on the spatial scale of 10-100 μm, but are largely homogenous on spatial scales comparable to the light source. For CCFL bulbs, common bulb separation may be in the range of 25-50 mm. For example, FIG. 1B illustrates a diffuser board 130 with a uniform array of lenticular microlenses 150.

One trend in lighting systems is to save energy, for example, by using fewer CCFL bulbs in a given BLU and spacing them further apart. This causes larger non-uniformity. Another trend is to make thinner lighting systems, for example thinner BLUs, by keeping the same bulb spacing, but moving the diffuser plate closer to the bulbs. This also leads to larger non-uniformity.

LED lighting systems including backlights are still an emerging technology, but may have spatial separations ranging from 5-100 mm. Some LED lighting systems such as backlights will be directly-lit in which case there is a pattern of bright spots that may be arranged in a square, hexagonal, or aperiodic symmetry. Some LED backlights will have linear arrays of LEDs that roughly simulate the distribution of light coming from CCFL bulbs. Some LED backlights will use light guide plates or other structures that emit light in various patterns.

According to various embodiments of the invention, diffuser films are created using microlenses or other surface structure (such as randomized structure), or other film properties, that are varied spatially in such a way as to provide an output with controlled spatial luminance variation. Thus, various embodiments of the invention can provide films with both microvariations (e.g., microlenses having features on a spatial scale <about 100 μm) as well as macrovariations (e.g., variations in at least one characteristic of the microlenses that vary with the light source spacing on the order of mm). Thus, some embodiments can provide a diffuser that comprises a substrate including optical structures therein and/or thereon that exhibit microvariations and macrovariations along the substrate. The microvariations may vary on the order of microns and the macrovariations may vary on the order of millimeters. In other embodiments, a ratio of the microvariations to macrovariations can be between about 1:100 and about 1:1000.

Figure 1C:
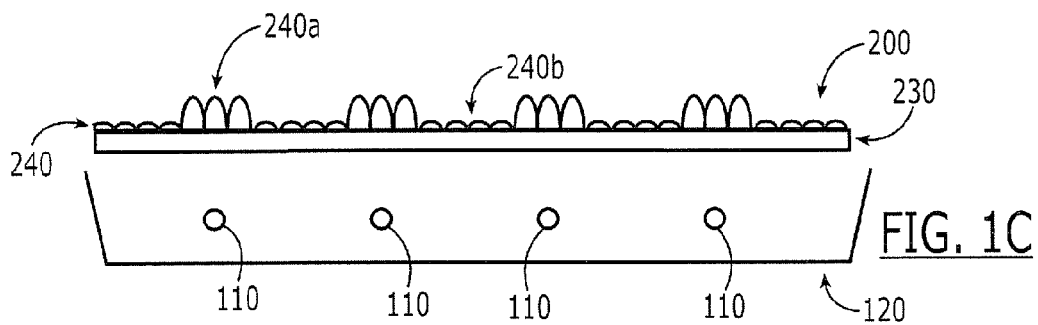
FIG. 1C is a cross-sectional view of a lighting system according to various embodiments of the invention.

As shown in FIG. 1C, an illumination system 200 according to various embodiments of the invention includes a diffuser (e.g., a textured film or diffuser board) that includes a substrate 230 having first and second opposing faces, the first face including a collection of a plurality of lenses 240 or shapes, at least some of which may be completely independent of one another and may be arranged in any spatial pattern. Thus, as shown in FIG. 1C, a diffuser is configured to diffuse radiation from a plurality of light sources 110 having a predetermined spacing (uniform and/or nonuniform) therebetween. The diffuser comprises a substrate 230 having first and second opposing faces, and an array of microlenses 240 on the first face. The microlenses 240 in the array include at least one feature that varies as a function of the predetermined spacing between the plurality of light sources as shown, for example, by the two types of lenses 240a and 240b that are provided on the substrate 230 as a function of the predetermined spacing between the plurality of light sources 110.

Figure 1D:
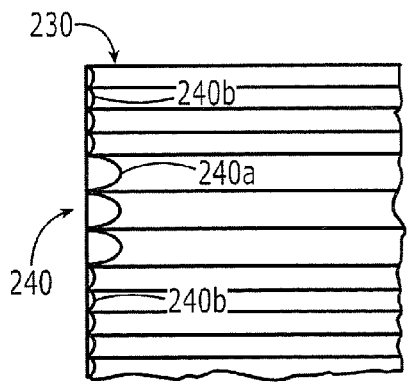
FIGS. 1D and 1E are top plan views of diffusers according to various embodiments of the invention.
Figure 1E:
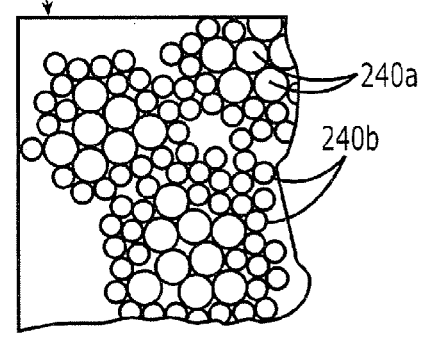

In some embodiments, as shown in FIG. 1D, textured diffuser boards have lenticular (2D) microlenses 240 which vary in shape in such a way that bulb variation from CCFL bulbs or other light source is reduced or controlled. In other embodiments, as shown in FIG. 1E, the microlenses have 3D texture that changes in response to 2D bulb placement, or a 3D texture that changes in response to 3D bulb placement.

In other embodiments, microlenses 240 on a thin gain-diffuser sheet can vary in shape in such a way that the brightness variation of light sources, such as CCFL bulbs, is reduced. The microlenses 240 vary from a first shape directly above the bulbs to a second shape directly between the bulbs. In particular, as will be described in detail below, the at least one feature may vary sufficiently as a function of the predetermined spacing between the plurality of light sources 110, so as to obscure the plurality of light sources 110 when the diffuser is viewed from opposite the plurality of light sources 110. In some embodiments, the at least one feature that varies can provide more refraction from the array of microlenses 240 adjacent the plurality of light sources compared to remote from the plurality of light sources 110 when the substrate 230 is closely spaced apart from plurality of light sources 110. In other embodiments, the at least one feature that varies can provide more reflection (for example, total internal reflection) from the array of microlenses 240 adjacent the plurality of light sources 110 compared to remote from the plurality of light sources 110, when the substrate 230 is closely spaced apart from the plurality of light sources.

Many different configurations of varying features may be provided according to various embodiments of the invention. Moreover, these various feature variations may be combined in various combinations and subcombinations. In any of these embodiments, a separate homogenous diffuser plate 130 may also be provided or may be omitted.

Figure 2A:
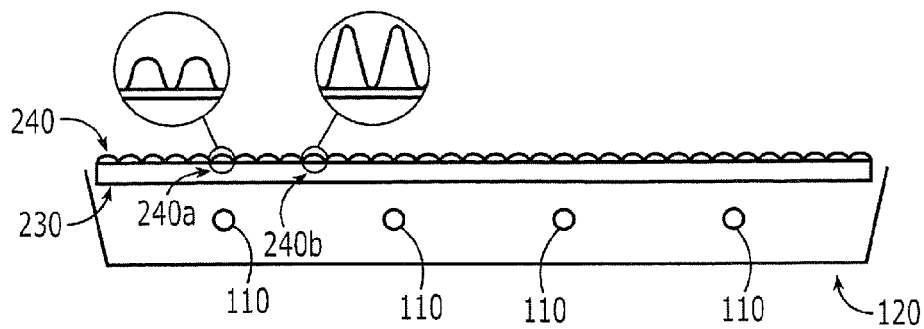
FIG. 2A is a perspective view of a lighting system according to various embodiments of the invention.
Figure 2B:
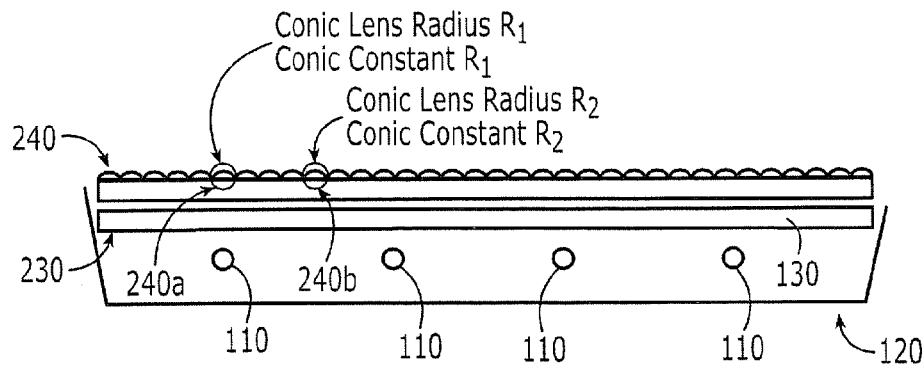
FIGS. 2B-2H are cross-sectional views of lighting systems according to various embodiments of the invention.
Figure 2C:
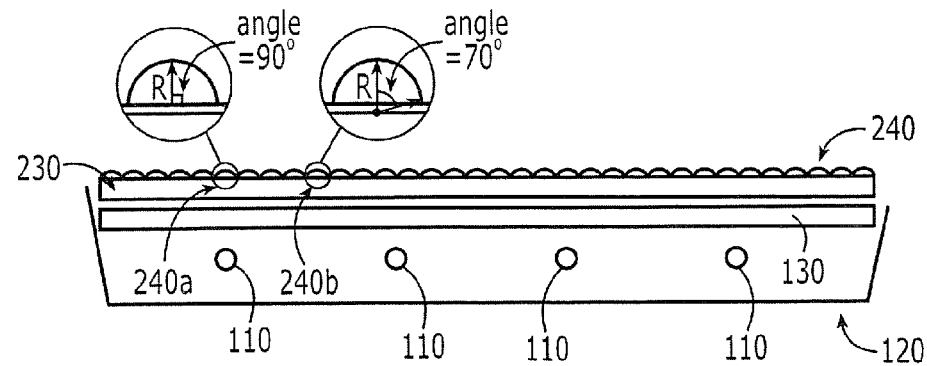
Figure 2D:
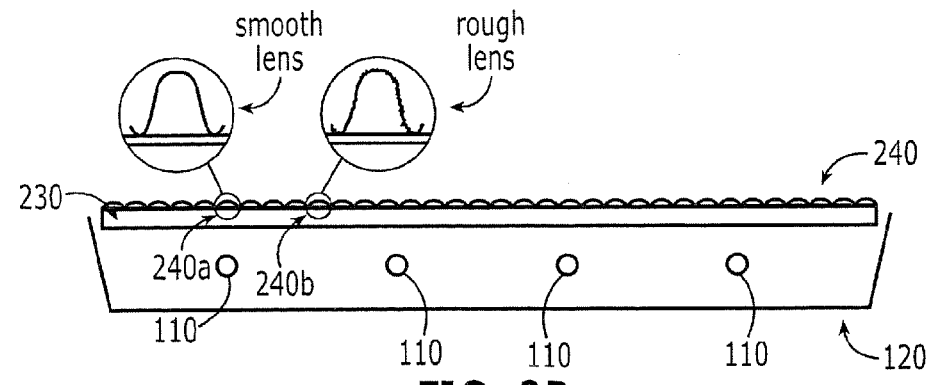
Figure 2E:
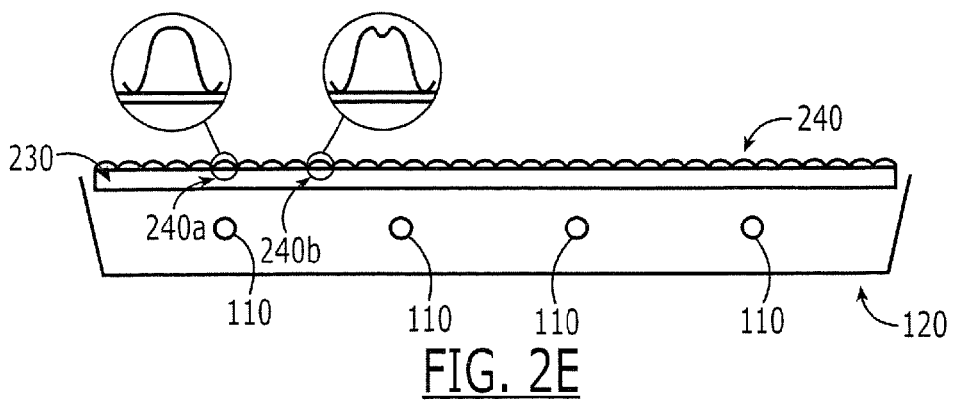
Figure 2F:
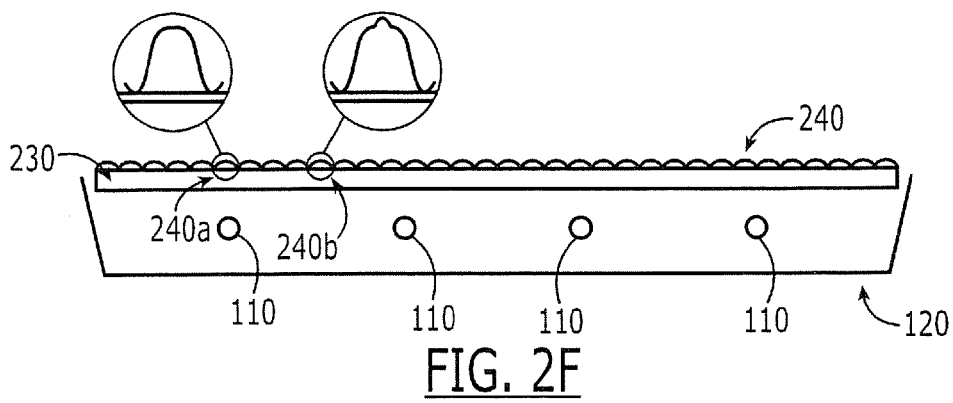
Figure 2G:
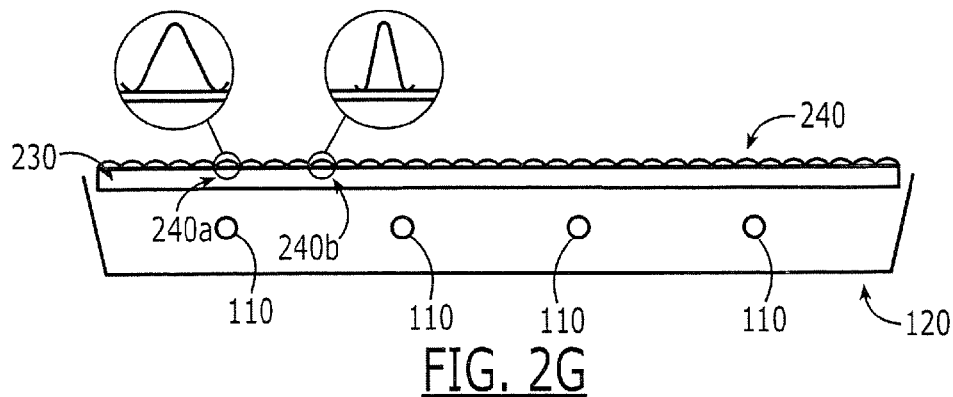
Figure 2H:
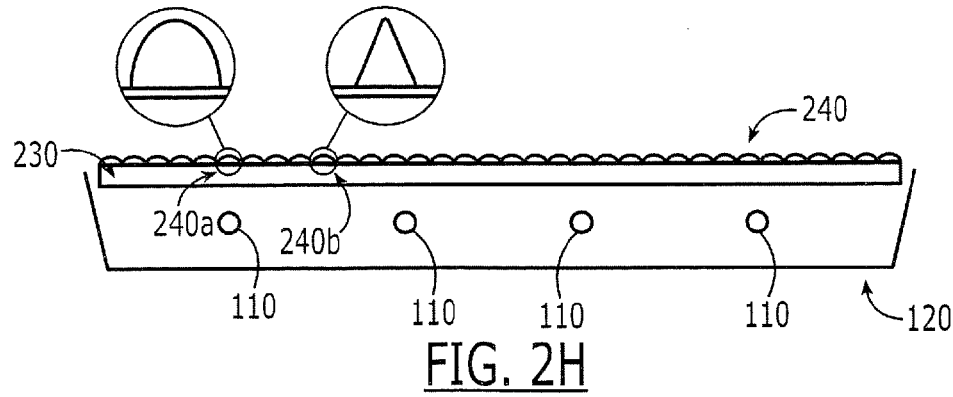

In particular, FIG. 2A illustrates a change in aspect ratio of the shape among two sets of microlenses 240a and 240b, such as the total height or total width of the shape, with the shape remaining otherwise substantially similar. FIG. 2B illustrates change in lens design between the shapes such as a change in the radius and conic constant of a conic formula describing the lens shape. FIG. 2C illustrates a change in shape extent, such as a 90° sector of a hemisphere in one location, and a 70° sector of a sphere in another location. FIG. 2D illustrates a change in features such as surface roughness imposed on a lens shape. FIG. 2E illustrates a change in surface features such as a dimple in the center of the surface of the lens shape. FIG. 2F illustrates a change in surface features such as a bump in the center of the surface of the lens shape. FIG. 2G illustrates a change in sidewall angle of the lens shape. FIG. 2H illustrates a change from a spherical shape to a conic shape. Moreover, any of these embodiments may also be accompanied by a random or pseudorandom variation of at least one feature that is independent of the spacing between the light sources.

Figure 2J:
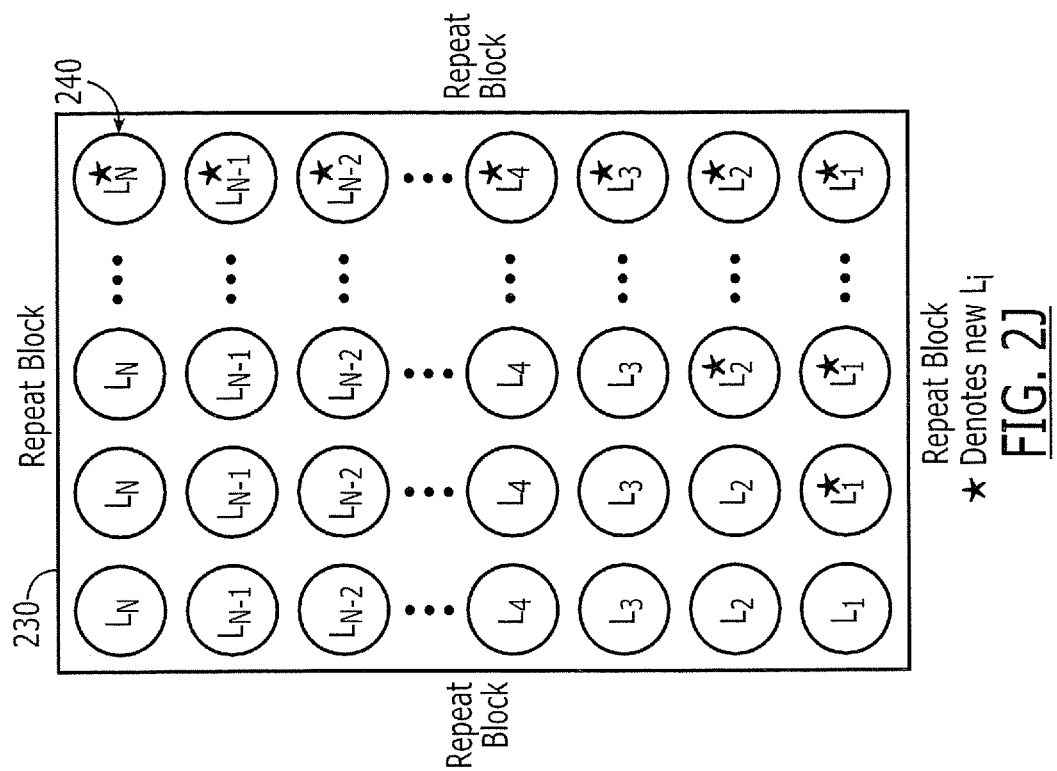
Figure 2I:
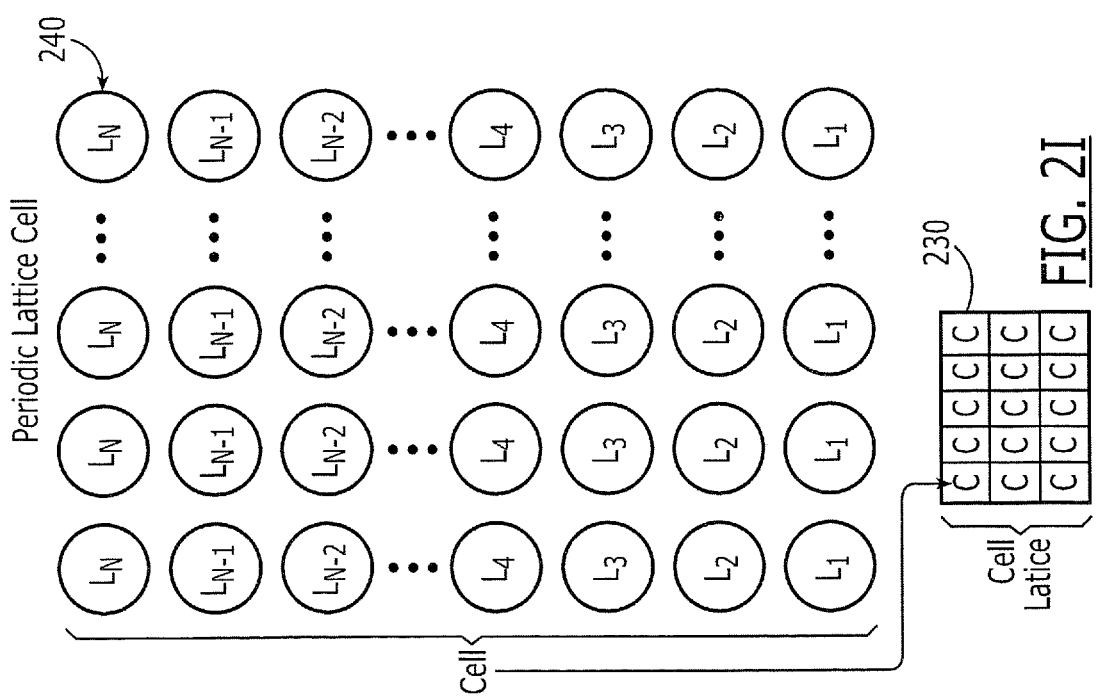

FIG. 2I illustrates a periodic arrangement of any of the above mentioned and/or other changes. Thus, in some embodiments, a unit cell (also referred to as a "lattice cell" or "cell") may have periodic variation of microlenses 240 as shown at the top portion of FIG. 2I and the unit cell may be replicated in one or more directions as shown at the bottom portion of FIG. 2I. Many different embodiments may be provided. For example, in FIG. 2I, the unit cell may vary in one or more characteristic of the individual microlenses 240 in the vertical direction as indicated by lenses $L_1 \ldots L_n$ but may be the same in the horizontal direction. This arrangement may be used, for example, with horizontally extending CCFL bulbs. In other embodiments, a 90° rotation may be provided so that the lenses vary in the horizontal direction but are the same in the vertical direction. In still other embodiments, the variation of a unit cell may occur along both horizontal and vertical directions.

FIG. 2J illustrates a progressive change in the composition of a periodic lattice of shapes including shapes with any of the above mentioned and/or other changes. Thus, in FIG. 2J, the changes in the lenses 240 occur in a progressive manner. For example, in the bottom row, the lens $L_1$ is varied to a lens $L_1'$ in the second and subsequent columns. In the second from the bottom row the lens $L_2$ is varied in the third and subsequent columns. In the third from the bottom row the lens $L_3$ is varied in the fourth and subsequent columns. This progressive change may occur in the horizontal direction, in the vertical direction, or in both directions. Moreover, the difference in changes between a given lens can be the same for each lens or may be different for different rows and/or columns.

FIG. 2K illustrates change in the organization of a sequence of periodic structures including shapes with any of the above mentioned and/or other changes. For example, the same pattern is repeated for a given row or column, but is shifted by one or more between adjacent rows or columns. Thus, in the diffuser shown in FIG. 2K, an offset of one is provided in the pattern between adjacent columns. In other embodiments, the offset may be provided in adjacent rows, and in still other embodiments the rows and the columns may be offset.

Figure 2N:
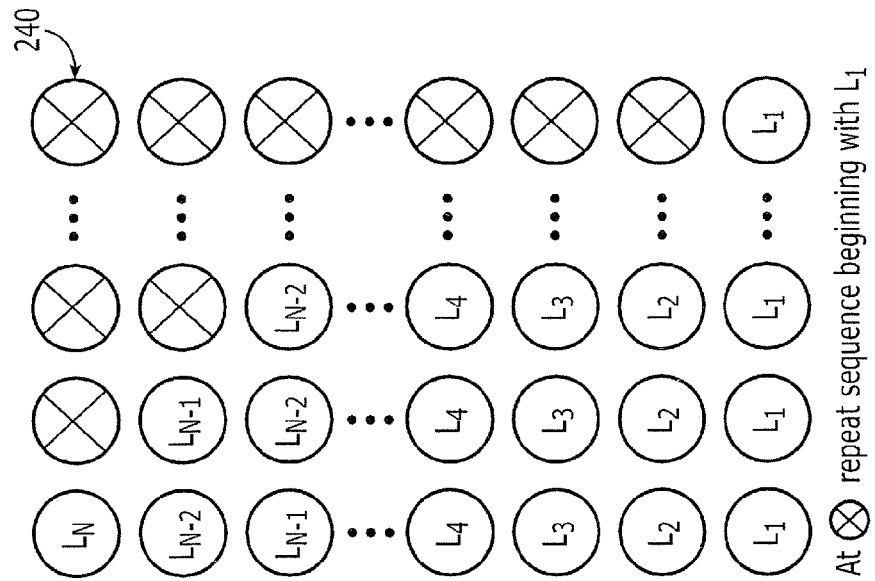
Figure 2M:
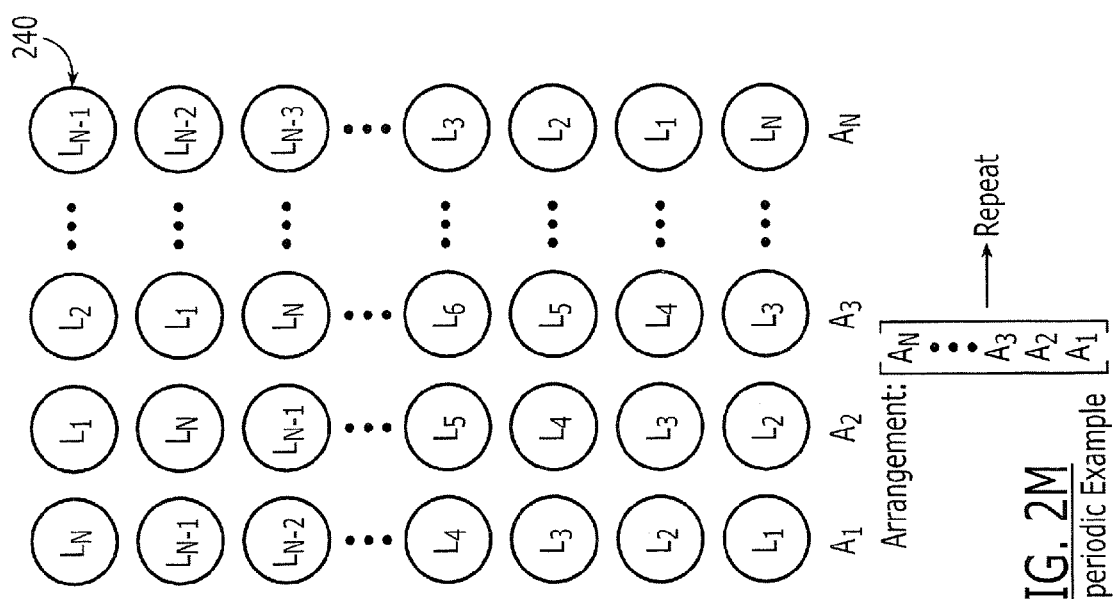

FIGS. 2L, 2M and 2N, respectively, illustrate aperiodic, pseudoperiodic and/or arbitrarily sequentially truncated periodic arrangements of shapes in the sense of FIGS. 2I-2K above. In the "sequentially truncated" example of FIG. 2N, the sequence of rows from $L_1 \ldots L_n$ in a given column may be truncated with each sequential column. Thus, for example, in the second column, the topmost microlens is $L_{n-1}$ and the microlens $L_n$ is not present. In the third column, the topmost microlens is $L_{n-2}$ and $L_{n-1}$, and the remaining microlenses are truncated. Similar arrangements may be provided for the rows and/or for the rows and columns. Moreover, this pattern may be repeated across an entire diffuser or may be used as a unit cell which is then repeated across the diffuser. In the "pseudoperiodic" example of FIG. 2M, the column arrays may be stacked in a pseudoperiodic arrangement so that the $A_2$ column is stacked above the $A_1$ column and the $A_3$ is stacked above the $A_2$ column in the first column of the array. In the second column of the array, the $A_3$ column is stacked above the $A_2$ column, followed by the $A_4$ column, etc. This stacking arrangement may be performed in the horizontal, vertical or both directions. Finally, in the "aperiodic" example of FIG. 2L, an arbitrary arrangement of lenses without any specific periodicity may be provided in the horizontal, vertical or both directions. Moreover, any of these embodiments may also be accompanied by a random or pseudorandom variation of at least one feature that is independent of the spacing between the light sources.

Figure 3:
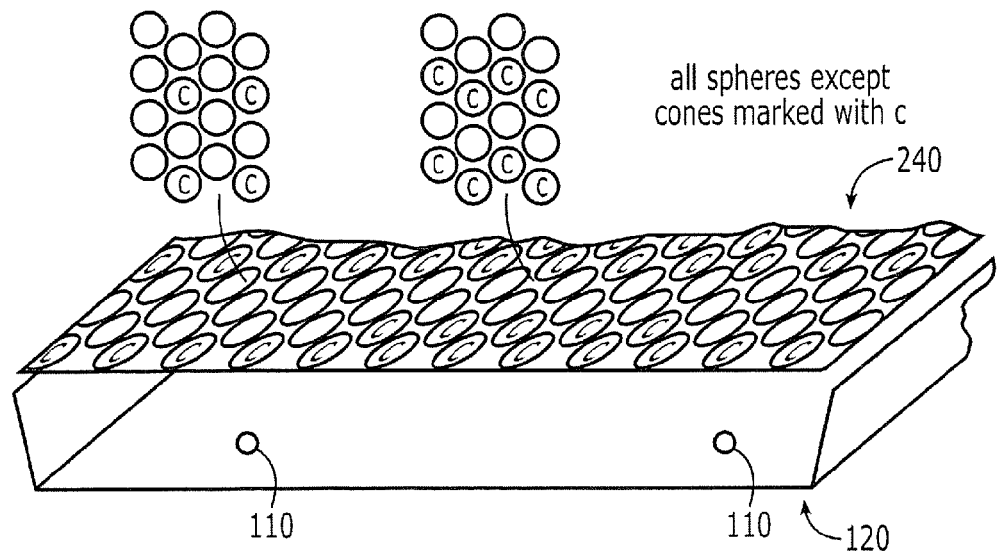
FIG. 3 is a perspective view of a lighting system according to various embodiments of the invention.

Referring to FIG. 3, in other embodiments, two different lenses are used, both of which have a similar footprint. In various positions relative to the light source, a locality will contain some proportion of one lens (for example, spheres), and some proportion of a second lens (for example, cones). In the locality over a light source, the proportion will be different than in a locality between light sources.

Figure 4:
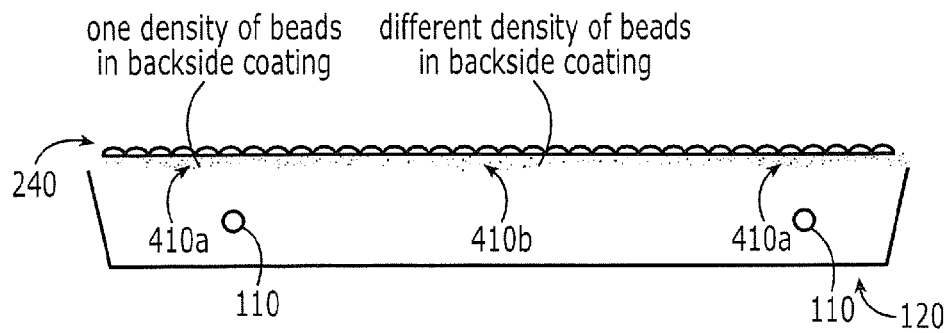
FIGS. 4 and 5 are cross-sectional views of lighting systems according to various embodiments of the invention.
Figure 5:
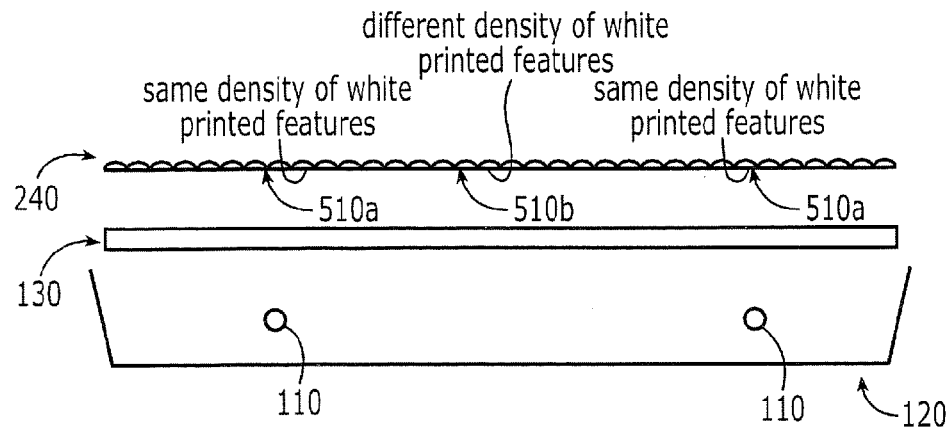

In display films it is common to coat a low density of small beads on the backside of the film. As shown in FIG. 4, in some embodiments this bead density 410a is high enough in some localities to affect the optical performance, and the bead density 410a/410b is varied in such a way as to reduce the variation due to light sources. Thus, in some embodiments, a uniform microlens array may be coupled with a nonuniform bead density or other variation on the back side coating. In still other embodiments, nonuniform microlenses may be provided on the front side and nonuniform bead density or other nonuniformity may be provided on the back side. Moreover, the substrate itself may be nonuniform in terms of transparency, reflectivity, color, etc. Accordingly, the front side of the substrate, the back side of the substrate and/or the internal construction of the substrate may be made nonuniform. In yet other embodiments, as illustrated in FIG. 5, a translucent substance 510, such as thin white paint, is printed in some locations, or printed in varying densities 510a and 510b (such as using a dot screen), such that it can reduce or control the variation due to light sources.

Note that, in some embodiments, the source lights 110 are distributed essentially one-dimensionally, such as CCFL bulbs which are usually oriented parallel to each other and in a horizontal direction. In this case the variation in the film may be designed to be only along the vertical direction. In other cases (such as LED sources behind the diffuser arranged in a square repeating pattern), the film may include features that vary in both the horizontal and vertical directions.

More detailed information about the art of influencing "lamp mura", which is the Japanese term for visible variations in brightness due to light sources, for example, in a BLU, will now be provided.

In general, the effect of a gain-diffuser film is a function of two characteristics of that diffuser film, which is generally used exterior to a diffuser board. The first is the single-pass gain of the film, which is the brightness of the film that would be measured from the direction normal to the display when the film is used on the backlight and reflected light is not allowed back into the backlight, divided by the brightness of the other backlight components without the film. Typical single-pass gains are from 60%-85%. The second is the reflectivity of the film, which is the proportion of light delivered to the film that is reflected back toward the backlight. Typical reflectivities are 30%-60%. The net effect of the film on the backlight is determined by these two quantities. In most cases, the backlight and diffuser board alone do not result in acceptable mura performance, and the diffuser film or films are used to further improve mura (i.e. improve uniformity when viewed on-axis). A similar argument applies to lens features that are created on the surface of a diffuser board.

Films and/or lenses on diffuser boards can improve mura two ways. First, a light ray that enters a diffuser film in one location is reflected back toward the source, whereupon the reflected light is scattered by the diffuser board and/or backlight unit and reemitted toward the film in a location that may be spatially different from the first location. This random process can be repeated many times and generally results in a smoother distribution of light. This process can be repeated with multiple layers of diffuser films, each film reflecting some of the light back toward the films below it. In addition or alternatively, a light ray that enters a first diffuser film in one location may be redirected in random directions toward a second diffuser film, and so-on through a stack of diffusers. In practice, the films are generally thin, so the spatial movement in the latter case is generally limited, which may limit its effectiveness at improving mura, and thus the former case often dominates.

According to various embodiments of the invention, lenses in a diffuser film can have higher reflectivity in bright areas (in the vicinity of a light source) and lower reflectivity between light sources, such that excess light in bright areas has the tendency to be reflected and possibly be re-emitted in the less-bright areas. Often a very subtle change in feature shape is all that is needed to have the desirable effect. In fact, if a shape changes so strongly that the viewing angles are substantially affected, one may create high uniformity when viewed on-axis (from the direction normal to the film), but one may fail to compensate for uniformity variations off-axis (when viewed from 45° below the display, for example), or even make them worse.

Figure 6:
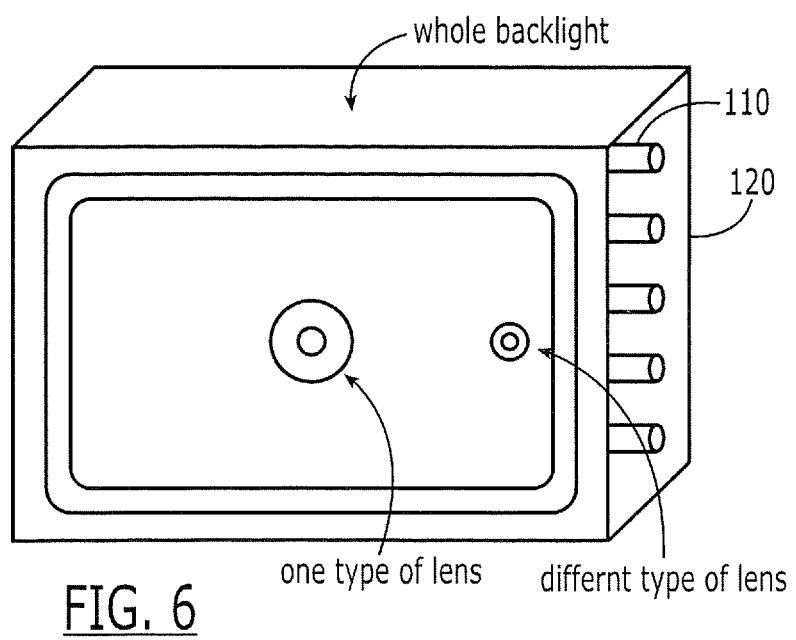
FIG. 6 is a perspective view of a lighting system according to various embodiments of the invention.

There is another problem that may be reduced or solved by some embodiments of the invention—that is, backlight units or other light sources often are brighter in the center than at the edges. More generally, they may have large-scale variation at points around the screen that is not strictly matched to bulb placement, the most common being center-to-edge variation. Some embodiments of the invention can provide films that vary continuously from center to edges, or in any other pattern, not necessarily matched to source light placement, to improve overall brightness uniformity. Other embodiments, can combine bulb compensation with this overall compensation, as shown in FIG. 6.

Optical diffusers according to various embodiments of the invention can be made by replicating a master. For example, optical diffusers can be made by replication of a master containing the desired shapes as described in U.S. Pat. No. 7,190,387 to Rinehart et al., entitled Systems And Methods for Fabricating Optical Microstructures Using a Cylindrical Platform and a Rastered Radiation Beam; U.S. Patent Application Publication No. 2005/0058948 A1 to Freese et al., entitled Systems and Methods for Mastering Microstructures Through a Substrate Using Negative Photoresist and Microstructure Masters So Produced; and/or U.S. Pat. No. 7,192,692 to Wood et al., entitled Methods for Fabricating Microstructures by Imaging a Radiation Sensitive Layer Sandwiched Between Outer Layers, U.S. Patent Application Publication No. 2006/0275714 to Rinehart et al., entitled Methods For Fabricating Optical Microstructures Using A Cylindrical Platform And A Rastered Radiation Beam, U.S. Patent Application Publication No. 2008/0233519 to Wood et al. entitled Methods For Fabricating Optical Microstructures By Imaging A Radiation Sensitive Layer Sandwiched Between Outer Layers, and 2007/0003868 to Wood et al. entitled Systems And Methods For Fabricating Blanks For Microstructure Masters By Imaging A Radiation Sensitive Layer Sandwiched Between Outer Layers, And Blanks For Microstructure Masters Fabricated Thereby, assigned to the assignee of the present invention, the disclosures of all of which are incorporated herein by reference in their entirety as if set forth fully herein. The masters themselves may be fabricated using laser scanning techniques described in these patents and published application, and may also be replicated to provide alignment films using replicating techniques described in these patents and published applications. Moreover, other suitable methods for fabricating the micro- and nano-structured layers may also be used.

Note also that in some embodiments, a separate diffuser plate 130 is used, but it may be possible with some embodiments, to eliminate the separate diffuser plate 130 entirely, or replace it with an inexpensive diffusing film and still achieve acceptable uniformity using the techniques taught herein.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

The present invention has been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

When an element is referred to as being coupled or connected to/with another element, it can be directly coupled or connected to/with the other element or intervening elements may also be present. In contrast, if an element is referred to as being directly coupled or connected to/with another element, then no other intervening elements are present. As used herein, the term "and/or" includes any and all combinations of one or more of the associated listed items. The symbol "/" is also used as a shorthand notation for "and/or".

It will be understood that although the terms first and second are used herein to describe various regions, layers and/or sections, these regions, layers and/or sections should not be limited by these terms. These terms are only used to distinguish one region, layer or section from another region, layer or section. Thus, a first region, layer or section discussed above could be termed a second region, layer or section, and similarly, a second region, layer or section could be termed a first region, layer or section without departing from the teachings of the present invention. Like numbers refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the specification, there have been disclosed embodiments of the invention and, although specific terms are employed, they are used in a generic and descriptive sense only and not for purposes of limitation. The following claim is provided to ensure that the present application meets all statutory requirements as a priority application in all jurisdictions and shall not be construed as setting forth the scope of the present invention.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A diffuser that is configured to diffuse radiation from a plurality of light sources having predetermined spacing therebetween, the diffuser comprising:
   a substrate having first and second opposing faces; and
   an array of microstructures on the first face, the microstructures in the array including at least one feature that varies as a function of the predetermined spacing between the plurality of light sources;
   wherein the array of microstructures comprises an array of repeating unit cells of microstructures, the microstructures in a respective repeating unit cell being defined by the at least one feature that varies as a function of the predetermined spacing between the plurality of light sources; and
   wherein the unit cells progressively change as a function of relative position on the substrate, in addition to varying as a function of the predetermined spacing between the plurality of light sources.

2. A diffuser according to claim 1 wherein the unit cells change in a sequentially truncated, pseudoperiodic and/or aperiodic manner as a function of position on the substrate.

3. A diffuser according to claim 1 in combination with the plurality of light sources having the predetermined spacing therebetween, wherein the plurality of light sources having the predetermined spacing therebetween are closely spaced apart from the substrate.

4. A diffuser according to claim 1 wherein the at least one feature varies a dimension of the microstructures, a type of the microstructures, a shape of the microstructures, an aspect ratio of the microstructures, a conic content of the microstructures, a shape extent of the microstructures, a surface roughness of the microstructures, a change in a surface feature on the microstructures, and/or a change in sidewall angle of the microstructures, as a function of the predetermined spacing between the plurality of light sources.

5. A diffuser according to claim 1 wherein the array of microstructures comprises an array of repeating unit cells of microstructures, the microstructures in a respective repeating unit cell being defined by the at least one feature that varies as a function of the predetermined spacing between the plurality of light sources.

6. A diffuser that is configured to diffuse radiation from a plurality of light sources having predetermined spacing therebetween, the diffuser comprising:
   a substrate having first and second opposing faces; and
   an array of microstructures on the first face, the microstructures in the array including at least one feature that varies as a function of the predetermined spacing between the plurality of light sources;
   wherein the array of microstructures comprises a plurality of first and second microstructures that are interspersed among one another on the first face and wherein the at least one feature varies a relative proportion of first and second microstructures that are interspersed among one another as a function of the predetermined spacing between the plurality of light sources.

7. A diffuser according to claim 6 in combination with the plurality of light sources having the predetermined spacing therebetween, wherein the plurality of light sources having the predetermined spacing therebetween are closely spaced apart from the substrate.

8. A diffuser according to claim 6 wherein the at least one feature varies a dimension of the microstructures, a type of the microstructures, a shape of the microstructures, an aspect ratio of the microstructures, a conic content of the microstructures, a shape extent of the microstructures, a surface roughness of the microstructures, a change in a surface feature on the microstructures, and/or a change in sidewall angle of the microstructures, as a function of the predetermined spacing between the plurality of light sources.

9. A diffuser according to claim 6 wherein the array of microstructures comprises an array of repeating unit cells of microstructures, the microstructures in a respective repeating unit cell being defined by the at least one feature that varies as a function of the predetermined spacing between the plurality of light sources.

10. A diffuser that is configured to diffuse radiation from a plurality of light sources having predetermined spacing therebetween, the diffuser comprising:
    a substrate having first and second opposing faces; and
    an array of microstructures on the first face, the microstructures in the array including at least one feature that varies as a function of the predetermined spacing between the plurality of light sources;
    wherein at least one feature of the microstructures in the array also varies as a function of a position of a microstructure relative to an edge of the substrate, in addition to varying as a function of the predetermined spacing between the plurality of light sources.

11. A diffuser according to claim 10 in combination with the plurality of light sources having the predetermined spacing therebetween, wherein the plurality of light sources having the predetermined spacing therebetween are closely spaced apart from the substrate.

12. A diffuser according to claim 10 wherein the at least one feature varies a dimension of the microstructures, a type of the microstructures, a shape of the microstructures, an aspect ratio of the microstructures, a conic content of the microstructures, a shape extent of the microstructures, a surface roughness of the microstructures, a change in a surface feature on the microstructures, and/or a change in sidewall angle of the microstructures, as a function of the predetermined spacing between the plurality of light sources.

13. A diffuser according to claim 10 wherein the array of microstructures comprises an array of repeating unit cells of microstructures, the microstructures in a respective repeating unit cell being defined by the at least one feature that varies as a function of the predetermined spacing between the plurality of light sources.

14. A diffuser that is configured to diffuse radiation from a plurality of light sources having predetermined spacing therebetween, the diffuser comprising:
   a substrate having first and second opposing faces; and
   an array of microstructures on the first face, the microstructures in the array including at least one feature that varies as a function of the predetermined spacing between the plurality of light sources;
   wherein at least one feature of the microstructures in the array also varies randomly or pseudorandomly independent of the predetermined spacing between the plurality of light sources, in addition to varying as a function of the predetermined spacing between the plurality of light sources.

15. A diffuser according to claim 14 wherein the at least one feature varies sufficiently as a function of the predetermined spacing between the plurality of light sources so as to obscure the plurality of light sources when the diffuser is viewed from opposite the plurality of light sources.

16. A diffuser according to claim 14 wherein the at least one feature that varies provides more refraction from the array of microstructures adjacent the plurality of light sources compared to remote from the plurality of light sources when the substrate is closely spaced apart from the plurality of light sources.

17. A diffuser according to claim 14 wherein the at least one feature that varies provides more reflection from the array of microstructures adjacent the plurality of light sources compared to remote from the plurality of light sources when the substrate is closely spaced apart from the plurality of light sources.

18. A diffuser according to claim 14 wherein the second face is configured to be adjacent the plurality of light sources and the first face is configured to be remote from the plurality of light sources when the substrate is closely spaced apart from the plurality of light sources.

19. A diffuser according to claim 14 wherein the microstructures in the array have a dimension that is less than about 100 μm and wherein the predetermined spacing is between about 0.1" and about 10".

20. A diffuser according to claim 14 wherein a ratio of a dimension of the microstructures and the predetermined spacing is between about 1:100 and about 1:1000.

21. A diffuser according to claim 14 wherein the at least one feature varies in one or more directions along the substrate as a function of the predetermined spacing between the plurality of light sources.

22. A diffuser according to claim 14 in combination with the plurality of light sources having the predetermined spacing therebetween, wherein the plurality of light sources having the predetermined spacing therebetween are closely spaced apart from the substrate.

23. A diffuser according to claim 14 wherein the at least one feature varies a dimension of the microstructures, a type of the microstructures, a shape of the microstructures, an aspect ratio of the microstructures, a conic content of the microstructures, a shape extent of the microstructures, a surface roughness of the microstructures, a change in a surface feature on the microstructures, and/or a change in sidewall angle of the microstructures, as a function of the predetermined spacing between the plurality of light sources.

24. A diffuser according to claim 14 wherein the array of microstructures comprises an array of repeating unit cells of microstructures, the microstructures in a respective repeating unit cell being defined by the at least one feature that varies as a function of the predetermined spacing between the plurality of light sources.

25. A diffuser according to claim 24 wherein the unit cells are identical.

26. A diffuser according to claim 14 wherein the substrate itself includes therein variable optical properties thereacross.

27. A diffuser according to claim 14 wherein the second face of the substrate includes variable optical properties thereacross.

* * * * *